United States Patent
Tanaka et al.

(10) Patent No.: US 10,220,394 B2
(45) Date of Patent: Mar. 5, 2019

(54) NOZZLE DEVICE AND PROCESSING APPARATUS

(71) Applicant: KABUSHIKI KAISHA TOSHIBA, Minato-ku (JP)

(72) Inventors: Masayuki Tanaka, Yokohama (JP); Takahiro Terada, Yokohama (JP); Shiguma Kato, Yokohama (JP); Yusuke Suzuki, Minato (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/124,005

(22) PCT Filed: Sep. 9, 2015

(86) PCT No.: PCT/JP2015/075649
§ 371 (c)(1),
(2) Date: Sep. 6, 2016

(87) PCT Pub. No.: WO2016/072152
PCT Pub. Date: May 12, 2016

(65) Prior Publication Data
US 2017/0259278 A1    Sep. 14, 2017

(30) Foreign Application Priority Data
Nov. 5, 2014 (JP) .................. 2014-225621

(51) Int. Cl.
*B05B 1/14* (2006.01)
*B05B 1/30* (2006.01)
(Continued)

(52) U.S. Cl.
CPC .................. *B05B 1/14* (2013.01); *B05B 1/30* (2013.01); *B23K 26/127* (2013.01); *B23K 26/147* (2013.01)

(58) Field of Classification Search
CPC .. B05B 1/14; B05B 1/30; B23K 26/12; B23K 26/127; B23K 26/1462–26/1494
(Continued)

(56) References Cited

U.S. PATENT DOCUMENTS

| 4,537,217 A | * | 8/1985 | Allen, Jr. ............... B01D 15/14 |
| | | | 137/561 A |
| 5,622,606 A | * | 4/1997 | Kugler ............... C23C 14/0063 |
| | | | 204/192.12 |

(Continued)

FOREIGN PATENT DOCUMENTS

| JP | 10-277449 A | 10/1998 |
| JP | 2001-272000 A | 10/2001 |

(Continued)

OTHER PUBLICATIONS

International Search Report dated Dec. 8, 2015 in PCT/JP2015/075649 Filed Sep. 9, 2015.

*Primary Examiner* — Darren W Gorman
*Assistant Examiner* — Juan C Barrera
(74) *Attorney, Agent, or Firm* — Oblon, McClelland, Maier & Neustadt, L.L.P.

(57) ABSTRACT

A nozzle device according to an embodiment includes a first opening, a plurality of second openings, and a first duct part. The first duct part includes at least one first branching part having a first part extending in a first direction and a plurality of second parts connected to a first end of the first part and extending in respective directions intersecting with the first direction. The first duct part connects the first opening and the second openings and is branched at least once by the first branching part in a path extending from the first opening to the second openings. The path lengths and the numbers of first branching parts between the first opening and the respective second openings are the same. The (Continued)

cross-sectional area of the first end of the first part is smaller than the cross-sectional area of a second end of the first part.

6 Claims, 13 Drawing Sheets

(51) Int. Cl.
  *B23K 26/12* (2014.01)
  *B23K 26/14* (2014.01)
(58) Field of Classification Search
  USPC .................................................. 239/548–568
  See application file for complete search history.

(56) References Cited

U.S. PATENT DOCUMENTS

| | | | |
|---|---|---|---|
| 5,851,270 | A | 12/1998 | Olander |
| 7,168,447 | B2 * | 1/2007 | Stadel ............... C23C 16/45563 |
| | | | 118/715 |
| 2014/0216577 | A1 * | 8/2014 | Huang ............... C23C 16/45563 |
| | | | 137/561 A |
| 2014/0283747 | A1 * | 9/2014 | Kasai .................. C23C 16/4401 |
| | | | 118/723 R |

FOREIGN PATENT DOCUMENTS

| | | |
|---|---|---|
| JP | 2002-25984 A | 1/2002 |
| JP | 2007-260487 A | 10/2007 |
| JP | 2013-154259 A | 8/2013 |
| JP | 2014-12239 A | 1/2014 |
| JP | 2016-87551 A | 5/2016 |
| TW | 386890 B | 4/2000 |

\* cited by examiner

NOZZLE DEVICE AND PROCESSING APPARATUS

CROSS-REFERENCE TO RELATED APPLICATIONS

This application is national stage application of International Application No. PCT/JP2015/075649, filed Sep. 9, 2015, which designates the United States, incorporated herein by reference, and which is based upon and claims the benefit of priority from Japanese Patent Application No. 2014-225621, filed Nov. 5, 2014, the entire contents of which are incorporated herein by reference.

FIELD

Embodiments described herein relate generally to a nozzle device and a processing apparatus.

BACKGROUND

Conventionally known are nozzles that discharge or suck a fluid from a plurality of openings. Such nozzles, for example, send a fluid supplied from a single supply port through ducts that connect the supply port and a plurality of openings and discharge it from the openings.

DETAILED DESCRIPTION

According to one embodiment, a nozzle device includes a first opening, a plurality of second openings, and a first duct part. The first duct part includes at least one first branching part having a first part extending in a first direction and a plurality of second parts connected to a first end of the first part and extending in respective directions intersecting with the first direction, the first duct part connecting the first opening and the second openings, branched at least once by the first branching part in a path extending from the first opening to the second openings, and having the same path length and the same number of first branching parts between the first opening and the second openings. The cross-sectional area of the first end of the first part is smaller than the cross-sectional area of a second end of the first part.

A first embodiment is described below with reference to FIGS. 1 to 6. To specify components according to the present embodiment and explain them, a plurality of expressions may be used. It is not prevented to use other expressions that are not used herein for the components and the explanation thereof. Furthermore, it is not prevented to use other expressions for components that are not described with a plurality of expressions and the explanation thereof.

Figure 1:
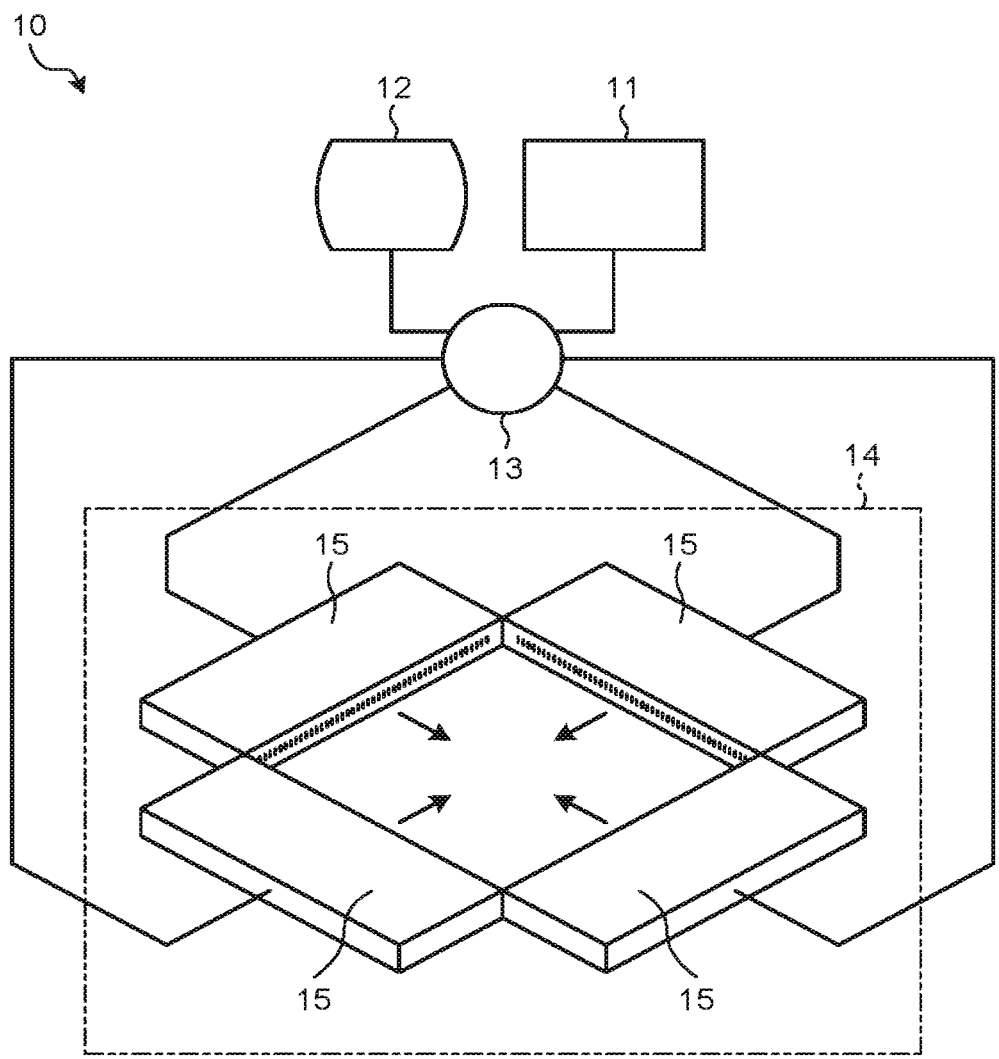
FIG. 1 is a diagram schematically illustrating a processing apparatus according to a first embodiment.

FIG. 1 is a diagram schematically illustrating a processing apparatus 10 according to the first embodiment. The processing apparatus 10 is an apparatus that performs laser beam machining, for example. The processing apparatus 10 is not limited thereto. As illustrated in FIG. 1, the processing apparatus 10 includes a control unit 11, a tank 12, a pump 13, a processing chamber 14, and a plurality of nozzle devices 15. The tank 12 is an example of an accommodating unit. The pump 13 is an example of a supply unit.

The control unit 11 controls the pump 13 and other parts of the processing apparatus 10. The tank 12 accommodates an inert gas, such as argon. The inert gas is an example of a fluid. The fluid is not limited thereto and may be other gases and liquids. The pump 13 is controlled by the control unit 11 to supply the inert gas in the tank 12 to the nozzle devices 15. The processing chamber 14 is made of a plurality of walls, for example, in an airtight manner. FIG. 1 schematically illustrates the processing chamber 14 with an alternate long and two short dashes line. The processing apparatus 10 performs laser beam machining on a workpiece arranged in the processing chamber 14.

The nozzle devices 15 are provided in the processing chamber 14 and arranged in a manner surrounding a stage on which the workpiece is placed, for example. The nozzle devices 15 discharge the inert gas supplied by the pump 13 toward the workpiece from the circumference of the workpiece.

Figure 2:
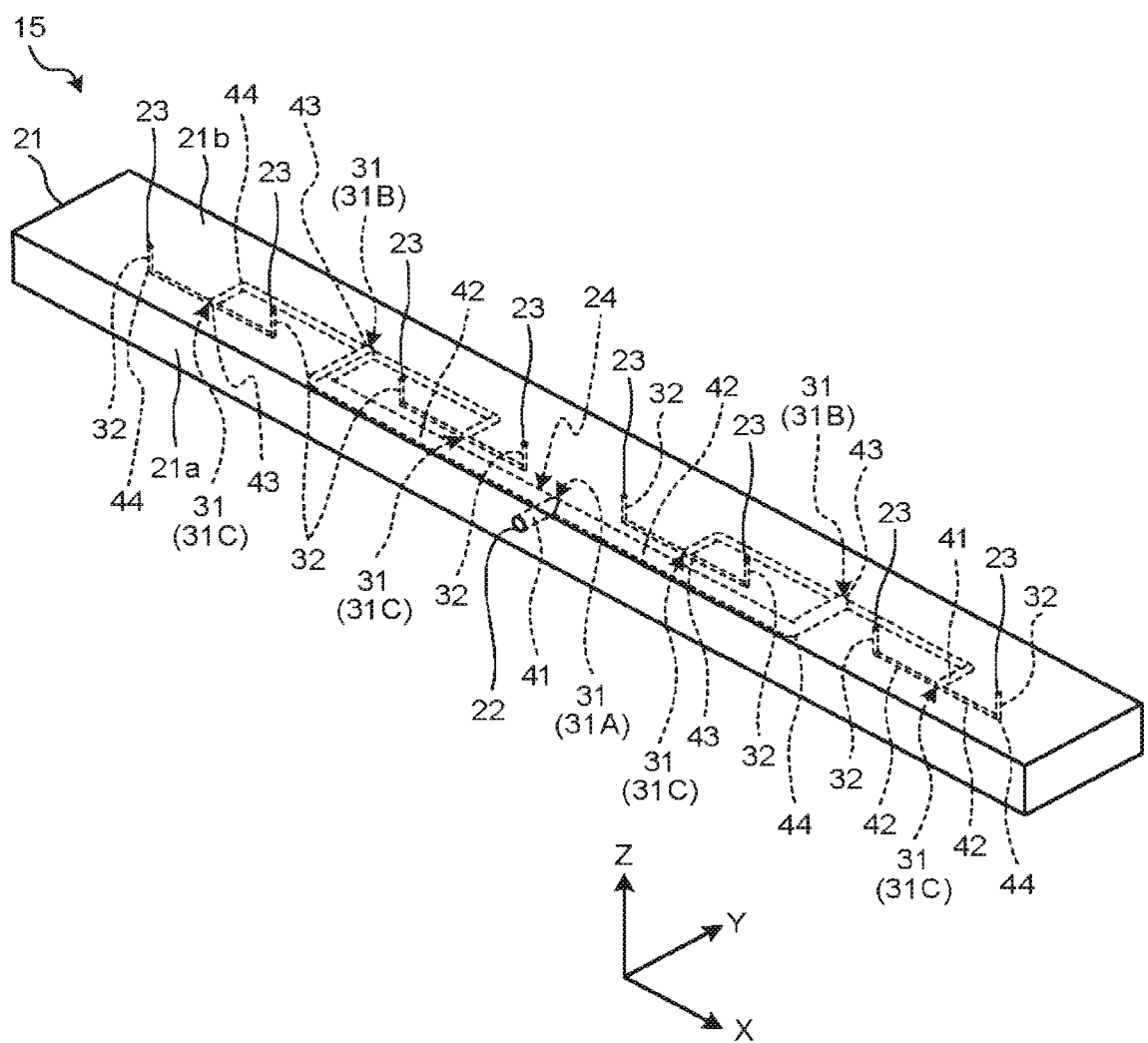
FIG. 2 is a perspective view of a nozzle device according to the first embodiment.

FIG. 2 is a perspective view of the nozzle device 15. As illustrated in FIG. 2, the nozzle device 15 includes a base 21, a supply port 22, a plurality of discharge ports 23, and a duct 24. The supply port 22 is an example of a first opening. The discharge port 23 is an example of a second opening. The duct 24 is an example of a first duct part.

The base 21 is formed into a rectangular parallelepiped block shape, for example. Therefore, the rigidity of the base 21 can be set higher. The shape of the base 21 is not limited thereto. The base 21 has a first surface 21a and a second surface 21b. The first and the second surfaces 21a and 21b are formed into substantially flat and are orthogonal to each other.

As illustrated in the drawings, an X-axis, a Y-axis, and a Z-axis are defined in the present specification. The X-axis, the Y-axis, and the Z-axis are orthogonal to one another. The X-axis extends along the length of the base 21. The Y-axis extends along the depth (width) of the base 21. The Z-axis extends along the thickness (height) of the base 21. The first surface 21a of the base 21 faces in a direction along the Y-axis. The second surface 21b of the base 21 faces in a direction along the Z-axis.

The supply port 22 is formed in the first surface 21a of the base 21. The supply port 22 is connected to the pump 13. The discharge ports 23 are formed in the second surface 21b of the base 21. The discharge ports 23 are arranged in line in a direction along the X-axis and communicate with the inside of the processing chamber 14. The arrangement of the supply port 22 and the discharge ports 23 is not limited thereto.

The duct 24 is a flow passage provided in the base 21 to connect the supply port 22 and the discharge ports 23. In other words, the supply port 22 is provided to one end of the duct 24, and the discharge ports 23 are provided to the other ends of the duct 24. The duct 24 includes a plurality of branching parts 31 and a plurality of nozzles 32. The branching part 31 is an example of a first branching part.

The branching part 31 is a part that divides the path extending from the supply port 22 to the discharge ports 23 into a plurality of (e.g., two) branches. The branching parts 31 according to the present embodiment branch the path extending from the supply port 22 to the discharge ports 23 at three stages. In other words, the duct 24 is branched three times in the path extending from the supply port 22 to the discharge ports 23. In the following description, the branching part 31 at the first stage may be referred to as a branching part 31A, the branching part 31 at the second stage may be referred to as a branching part 31B, and the branching part 31 at the third stage may be referred to as a branching part 31C.

Figure 3:
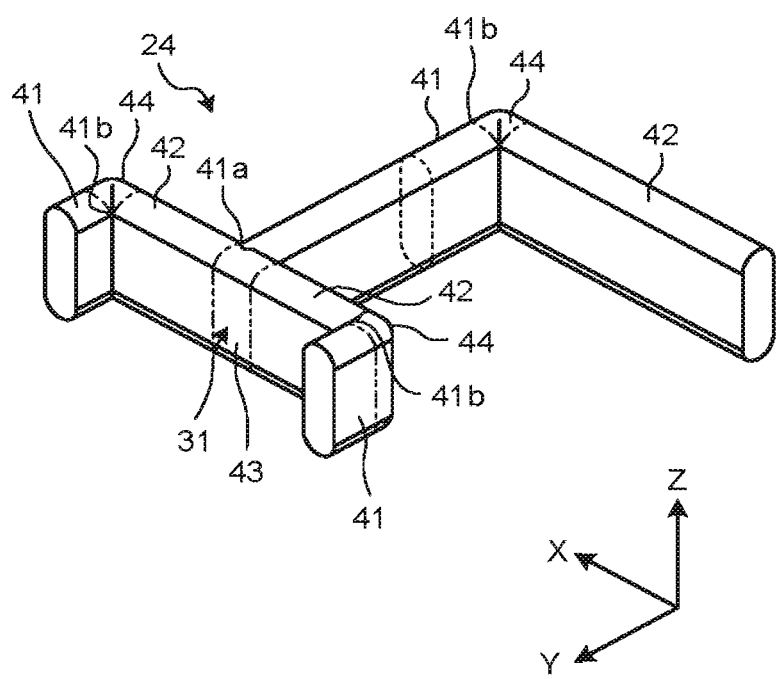
FIG. 3 is a perspective view of a shape of a branching part according to the first embodiment.

FIG. 3 is a perspective view of the shape of the branching part 31. As illustrated in FIG. 3, the branching part 31 according to the first embodiment is formed into a T-shape. The branching part 31 has a first part 41, two second parts 42, and a connecting part 43. FIG. 3 illustrates not only one branching part 31 but also the first and the second parts 41 and 42 of another branching part 31 connected to the branching part 31 for explanation.

The first part 41 linearly extends in the direction along the Y-axis. The direction along the Y-axis is an example of a first direction. The first parts 41 of the respective branching parts 31 extend in parallel with the direction along the Y-axis.

The second parts 42 are connected to a first end 41a of the first part 41 by the connecting part 43. The second parts 42 linearly extend from the connecting part 43 in respective directions along the X-axis. In other words, the second parts 42 extend in respective directions intersecting with the Y-axis at 90 degrees. The direction intersecting with the Y-axis at 90 degrees is an example of a direction intersecting with the first direction. The two second parts 42 extend in mirror symmetry and rotational symmetry with respect to the direction in which the first part 41 extends. The second parts 42 are not limited thereto.

In the branching part 31A at the first stage, a second end 41b of the first part 41 is connected to the supply port 22. The second end 41b of the first part 41 is positioned opposite to the first end 41a. The second parts 42 of the branching part 31A at the first stage are connected to the respective second ends 41b of the first parts 41 of the branching parts 31B at the second stage by couplers 44. In other words, the second part 42 of the branching part 31A and the second end 41b of the first part 41 of the branching part 31B are connected by the coupler 44.

The second parts 42 of the branching part 31B at the second stage are connected to the respective second ends 41b of the first parts 41 of the branching parts 31C at the third stage by the couplers 44. As illustrated in FIG. 2, the first parts 41 of the branching parts 31C extend in a direction opposite to the direction in which the first parts 41 of the branching parts 31A and 31B extend. This structure can reduce the length of the base 21 in the direction along the Y-axis.

The second parts 42 of the branching part 31C at the third stage are connected to the respective nozzles 32 by the couplers 44. In other words, the second part 42 of the branching part 31C and the nozzle 32 are connected by the coupler 44. The nozzles 32 extend in the direction along the Z-axis and connect the second parts 42 of the branching part 31C and the respective discharge ports 23.

The cross-sectional areas of the first and the second parts 41 and 42 of the branching part 31B at the second stage are smaller than those of the first and the second parts 41 and 42 of the branching part 31A at the first stage. The cross-sectional areas of the first and the second parts 41 and 42 of the branching part 31C at the third stage are smaller than those of the first and the second parts 41 and 42 of the branching part 31B at the second stage. As described above, the cross-sectional area of the duct 24 decreases from the supply port 22 to the discharge ports 23.

The path lengths between the supply port 22 and the respective discharge ports 23 are the same in the duct 24. In the present specification, the case where the path lengths between the supply port 22 and the respective discharge ports 23 are the same includes a case where an error caused by a dimensional tolerance is present in the path lengths, for example.

Furthermore, the numbers of branching parts 31 provided between the supply port 22 and the respective discharge ports 23 are the same in the duct 24. In other words, the same number of (three, in the present embodiment) branching parts 31 are provided to the paths extending from the supply port 22 to the respective discharge ports 23.

Furthermore, the shapes and the sizes of the branching parts 31 provided at the stages are the same. In other words, two branching parts 31B at the second stage have the same shape and the same size, and four branching parts 31C at the third stage have the same shape and the same size.

As described above, the path lengths and the structures of the paths extending between the supply port 22 and the respective discharge ports 23 are the same. As a result, resistances acting on the fluid flowing through the paths between the supply port 22 and the respective discharge ports 23 are equal (equivalent conductance).

As illustrated in FIG. 3, the duct 24 including the branching parts 31 has a cross-sectional shape of a substantially elongated circle. While the cross-sectional shape of the duct 24 illustrated in FIG. 3 is an elongated circle having two parallel sides extending in the direction along the Z-axis, it may be an ellipse. The cross-sectional shape of the duct 24 is not limited thereto and may be another shape, such as a circle, a rectangle, and a square.

The cross-sectional shape of the first part 41, for example, is an elongated circle extending in the direction along the Z-axis. In other words, the cross-sectional shape of the first part 41 has the length in the direction along the X-axis smaller than that in the direction along the Z-direction. The length in the direction along the X-axis is an example of a width and is the length in a direction in which the second part 42 of another branching part 31 orthogonal to the first part 41 extends in a planar view in the direction in which the first part 41 extends (viewed in the Y-axis direction). The length in the direction along the Z-axis is an example of a length in the second direction and is the length in a direction orthogonal both to the first direction (direction along the Y-axis) and to the direction in which the second part 42 extends (direction on the X-Y plane).

Figure 4:
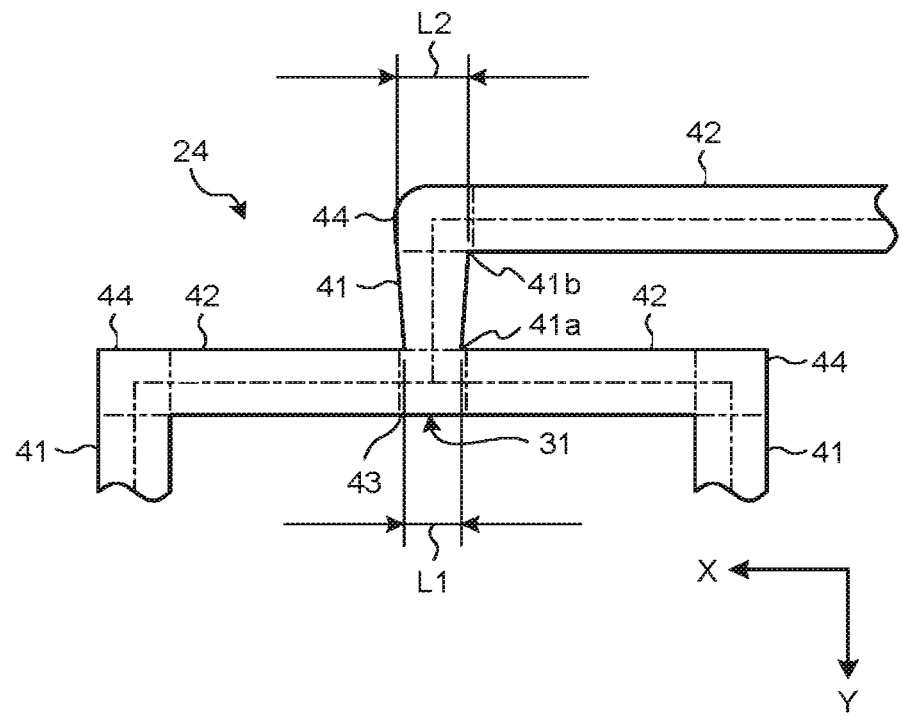
FIG. 4 is a plan view of the shape of the branching part according to the first embodiment.

FIG. 4 is a plan view of the shape of the branching part 31. As illustrated in FIG. 4, the cross-sectional area of the first part 41 becomes smaller as the first part 41 extends from the second end 41b to the first end 41a. In other words, the cross-sectional area of the first end 41a of the first part 41 is smaller than that of the second end 41b of the first part 41.

A length (width) L1 of the first end 41a of the first part 41 in the direction along the X-axis is smaller than a length (width) L2 of the second end 41b of the first part 41 in the direction along the X-axis. The length L1 is equal to or smaller than 80% of the length L2, for example. Furthermore, the cross-sectional area of the first end 41a of the first part 41 is substantially equal to or smaller than 80% of the cross-sectional area of the second end 41b of the first part 41. Each of the length L1 and cross-sectional area of the first end 41a is not limited thereto.

Figure 5:
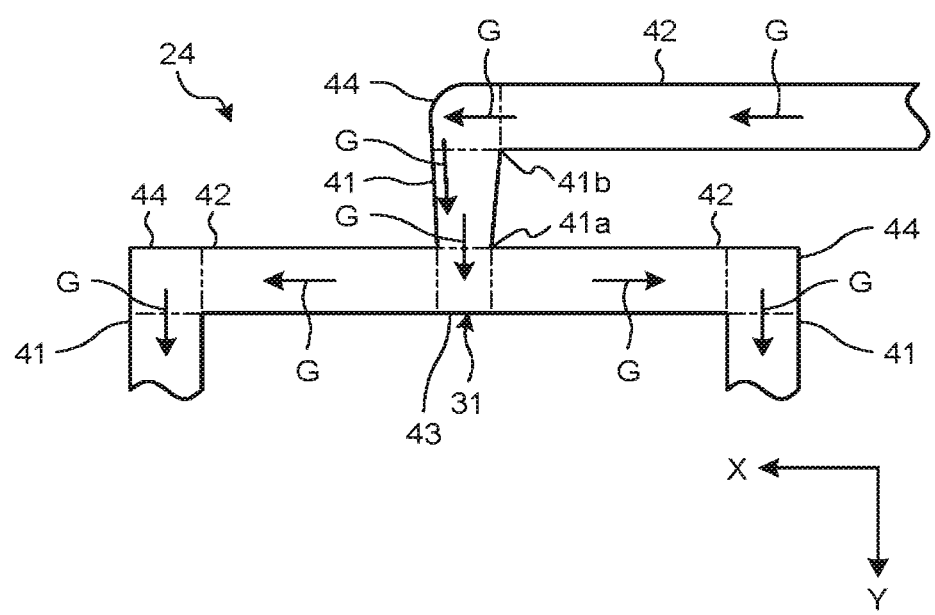
FIG. 5 is a plan view schematically illustrating the branching part through which an inert gas flows according to the first embodiment.

FIG. 5 is a plan view schematically illustrating the branching part 31 through which an inert gas G flows. The pump 13 supplies the inert gas G to the supply port 22. The inert gas G flows into the duct 24 from the supply port 22 and passes through a plurality of branching parts 31. The inert gas G is branched three times by the branching parts 31A, 31B, and 31C at three stages, passes through the nozzles 32, and is discharged from the respective discharge ports 23 to the inside of the processing chamber 14.

As illustrated in FIG. 5, the inert gas G flowing through the second part 42 of the branching part 31 provided on the upstream passes through the coupler 44 and flows into the first part 41 of the branching part 31 provided on the downstream. FIG. 5 schematically illustrates the inert gas G flowing through the branching part 31 by the arrows.

The second part 42 extends in the direction along the X-axis. As a result, the inert gas G flowing into the first part 41 is brought closer to the outer side (left side in FIG. 5) of the first part 41 by an inertial force and flows through the first part 41. The outer side of the first part 41 is the side farther from the connecting part 43 of the branching part 31 provided on the upstream. In other words, the inert gas G in the first part 41 is unevenly distributed in the direction along the X-axis. The inert gas G in the first part 41 is substantially evenly distributed in the direction along the Z-axis.

As described above, the cross-sectional area of the first part 41 becomes smaller as the first part 41 extends from the second end 41b to the first end 41a. As a result, the inert gas G in the first part 41 converges at the center in the direction along the X-axis as it travels toward the first end 41a. In other words, the inert gas G at the first end 41a of the first part 41 is more evenly distributed in the direction along the X-axis than the inert gas G at the second end 41b of the first part 41.

The inert gas G is sent from the first end 41a of the first part 41 to the two second parts 42 via the connecting part 43. Because the inert gas G converges at the first end 41a of the first part 41, the inert gas G is branched more evenly and flows into the two second parts 42. In other words, the flow rate of the inert gas G flowing into one of the second parts 42 is substantially equal to that of the inert gas G flowing into the other of the second parts 42.

Figure 6:
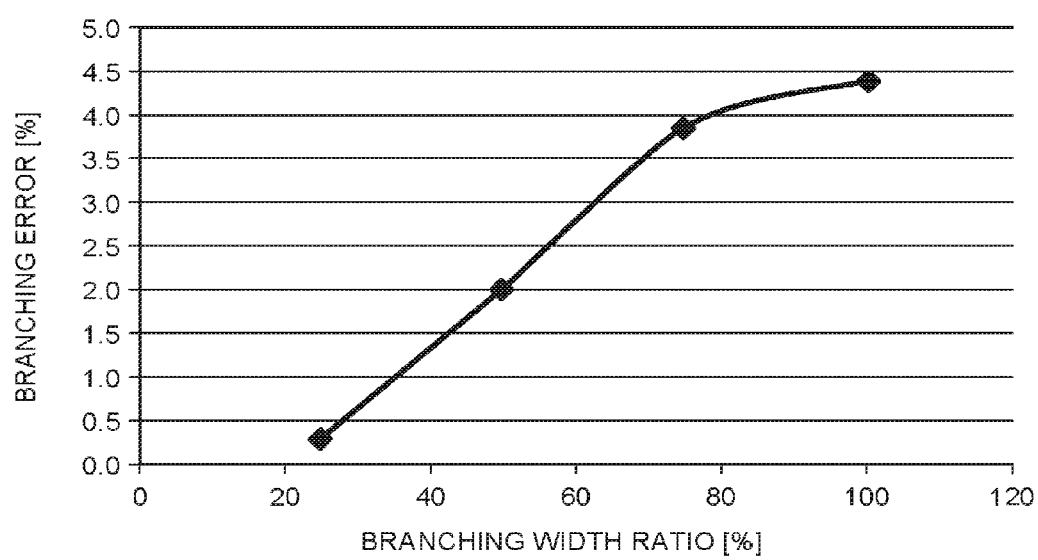
FIG. 6 is a graph indicating a branching error with respect to a branching part width ratio according to the first embodiment.

FIG. 6 is a graph indicating a branching error of the inert gas G sent to the two second parts 42 with respect to the ratio of the widths of the first part 41. The horizontal axis in FIG. 6 indicates the percentage (branching part width ratio) of the length L1 to the length L2. The vertical axis in FIG. 6 indicates a bias (branching error) of the inert gas G flowing into the two second parts 42. A branching error of 1% indicates that the ratio of the flow rates of the inert gas G flowing into the two second parts 42 is 51:49.

As illustrated in FIG. 6, as the branching part width ratio decreases to equal to or lower than 80%, the branching error drastically decreases. In other words, setting the length L1 to equal to or smaller than 80% of the length L2 effectively reduces the branching error. Furthermore, setting the cross-sectional area of the first end 41a of the first part 41 to equal to or smaller than 80% of the cross-sectional area of the second end 41b of the first part 41 effectively reduces the branching error.

The nozzle device 15 described above is additively manufactured by a 3D printer, for example. The nozzle device 15 is made of various materials, such as a synthetic resin and a metal. The nozzle device 15 is made of a material having resistance to the fluid (inert gas G) supplied by the nozzle device 15.

The 3D printer, for example, repeats formation of a layer of the material and hardening of the layer of the material in the direction along the Z-axis, thereby manufacturing the nozzle device 15. The duct 24 may be cut and shaped in the middle of additive manufacturing of the layers constituting the nozzle device 15. In the middle of additive manufacturing of the layers constituting the nozzle device 15, surfaces of the duct 24 other than those facing downward, for example, can be cut and shaped.

The nozzle device 15 may be manufactured by a method other than additive manufacturing. The nozzle device 15, for example, may be manufactured by joining a plurality of members formed by cutting as the respective parts of the duct 24.

In the processing apparatus 10 according to the first embodiment, the path lengths and the structures of the paths extending between the supply port 22 and the respective discharge ports 23 are the same. As a result, the flow rates of the inert gas G discharged from the discharge ports 23 are made more uniform regardless of the flow rate of the inert gas G supplied to the supply port 22. In other words, the distribution of the flow rates of the inert gas G discharged from the discharge ports 23 are prevented from varying depending on the flow rate of the inert gas G supplied to the supply port 22.

The cross-sectional area of the duct 24 becomes smaller as the duct 24 extends from the supply port 22 to the discharge ports 23. This structure reduces a pressure loss of the inert gas G flowing through the duct 24 and makes the flow rates of the inert gas G discharged from the discharge ports 23 more uniform.

The nozzle device 15 is additively manufactured by a 3D printer. With this method, the shape of the duct 24 can be more optionally determined than in a case where the duct 24 is shaped by cutting. Furthermore, the supply port 22 and the discharge ports 23 can be more optionally arranged.

The cross-sectional area of the first end 41a of the first part 41 is smaller than that of the second end 41b of the first part 41. Even if the inert gas G flowing from the second part 42 of another branching part 31 into the first part 41 is unevenly distributed in the first part 41 by an inertial force, for example, the inert gas G is collected at the first end 41a of the first part 41 having a smaller cross-sectional area and is sent to the second parts 42 via the connecting part 43. As a result, the inert gas G is sent to the second parts 42 more uniformly. Consequently, the flow rates of the inert gas G finally discharged from the discharge ports 23 are made more uniform.

The inert gas G flowing from the second part 42 of another branching part 31 into the first part 41 is unevenly distributed by the inertial force in the direction in which the second part 42 extends (direction along the X-axis). The length L1 of the first end 41a of the first part 41 is smaller than the length L2 of the second end 41b of the first part 41. The lengths L1 and L2 are lengths in the direction in which the second part 42 of another branching part 31 orthogonal to the first part 41 extends in a planar view in the direction in which the first part 41 extends. This structure eliminates the uneven distribution of the inert gas G sent from the first part 41 to the second parts 42, thereby sending the inert gas G to the second parts 42 more uniformly.

The length L1 of the first end 41a of the first part 41 is equal to or smaller than 80% of the length L2 of the second end 41b of the first part 41. By setting the length L2 to the value described above, the inert gas G is sent to the second parts 42 more uniformly as illustrated in FIG. 6. Furthermore, the cross-sectional area of the first end 41a of the first part 41 is substantially equal to or smaller than 80% of the cross-sectional area of the second end 41b of the first part 41. By setting in this manner, the inert gas G is sent to the second parts 42 more uniformly as illustrated in FIG. 6.

In the cross-sectional shape of the first part 41, the length in the direction along X-axis (length in the direction in which the second part 42 of another branching part 31 orthogonal to the first part 41 extends in a planar view in the direction in which the first part 41 extends) is smaller than the length in the direction along Z-axis (length in the direction orthogonal both to the direction along the Y-axis and to the direction in which the second part 42 extends). This structure suppresses, in the first part 41, uneven distribution of the inert gas G flowing from the second part 42 of another branching part 31 into the first part 41 via the coupler 44 caused by the inertial force, for example, and sends the inert gas G to the second parts 42 via the connecting part 43. In additive manufacturing performed by a 3D printer, for example, this structure can secure a wider part on the surface of the duct 24 as a part capable of being smoothed by cutting. Furthermore, compared with a structure in which the length in the direction along the X-axis is equal to or larger than that in the direction along the Z-axis, this structure suppresses uneven distribution of the inert gas G in the first part 41 in the direction along the X-axis.

A second embodiment is described below with reference to FIGS. 7 and 8. In the following descriptions of embodiments, components having functions similar to those of already described components are denoted by the same reference numerals as those of the already described components, and explanation thereof may be omitted. All the functions and the properties of a plurality of components denoted by the same reference numeral are not necessarily the same, and the components may have different functions and properties depending on the embodiments.

Figure 7:
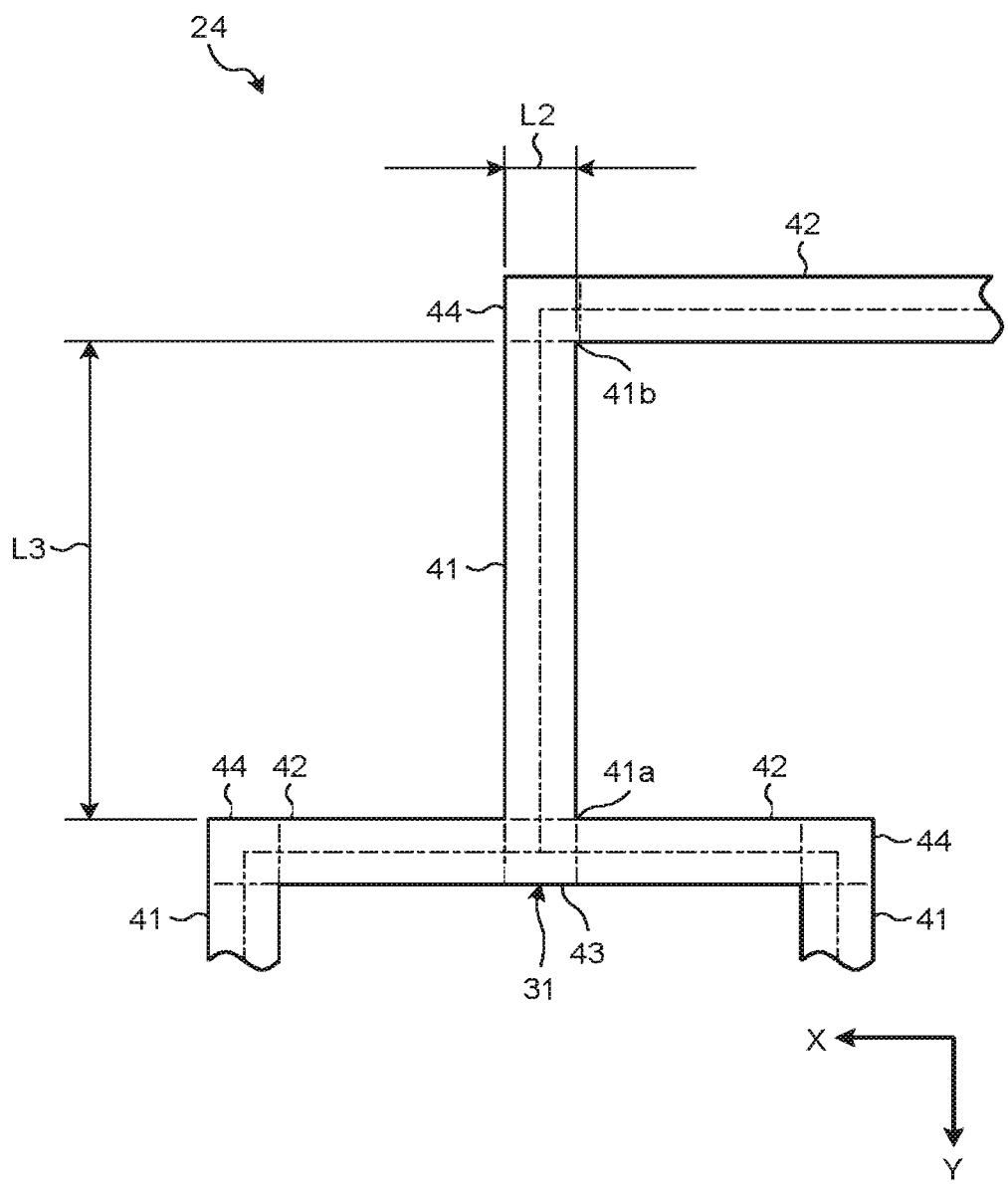
FIG. 7 is a plan view of the shape of the branching part according to a second embodiment.

FIG. 7 is a plan view of the shape of the branching part 31 according to the second embodiment. As illustrated in FIG. 7, the length L1 of the first end 41a of the first part 41 according to the second embodiment in the direction along the X-axis is equal to the length L2 of the second end 41b of the first part 41 in the direction along the X-axis. FIG. 7 illustrates the length L2 alone.

A length L3 of the first part 41 from the first end 41a to the second end 41b is larger than the lengths L1 and L2 of the first part 41 in the direction along the X-axis. The length L3 is equal to or larger than five times the lengths L1 and L2, for example. The length L3 is not limited thereto.

Figure 8:
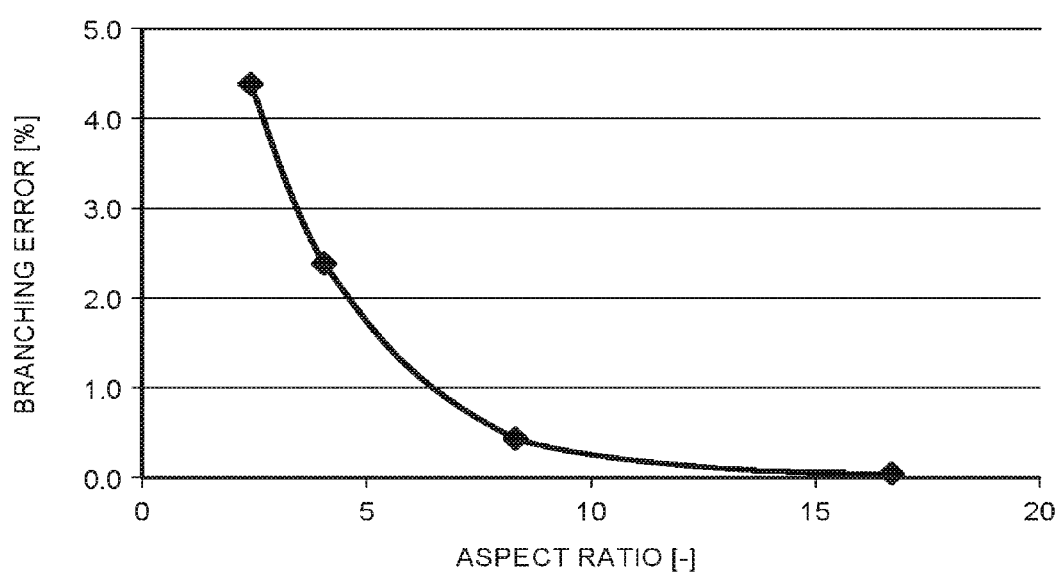
FIG. 8 is a graph indicating a branching error with respect to an aspect ratio according to the second embodiment.

FIG. 8 is a graph indicating a branching error of the inert gas G sent to the two second parts 42 with respect to the aspect ratio of the first part 41. The horizontal axis in FIG. 8 indicates the ratio (aspect ratio) of the length L3 to the lengths L1 and L2. The vertical axis in FIG. 8 indicates a bias (branching error) of the inert gas G flowing into the two second parts 42.

As illustrated in FIG. 8, as the aspect ratio increases to equal to or higher than 5, the branching error decreases. In other words, setting the length L3 to equal to or larger than five times the lengths L1 and L2 effectively reduces the branching error. As the aspect ratio increases to equal to or higher than 8, the branching error further decreases.

In the processing apparatus 10 according to the second embodiment, the length L3 of the first part 41 from the first end 41a to the second end 41b is equal to or larger than five times the lengths L1 and L2 of the first part 41. Even if the inert gas G flowing from the second part 42 of another branching part 31 into the first part 41 is unevenly distributed in the first part 41 by an inertial force, for example, the uneven distribution of the inert gas G is substantially eliminated while the inert gas G is passing through the first part 41. The inert gas G is then sent to the second parts 42 via the connecting part 43. As a result, as illustrated in FIG. 8, the inert gas G is sent to the second parts 42 more uniformly. Consequently, the flow rates of the inert gas G finally discharged from the discharge ports 23 are made more uniform.

Figure 9:
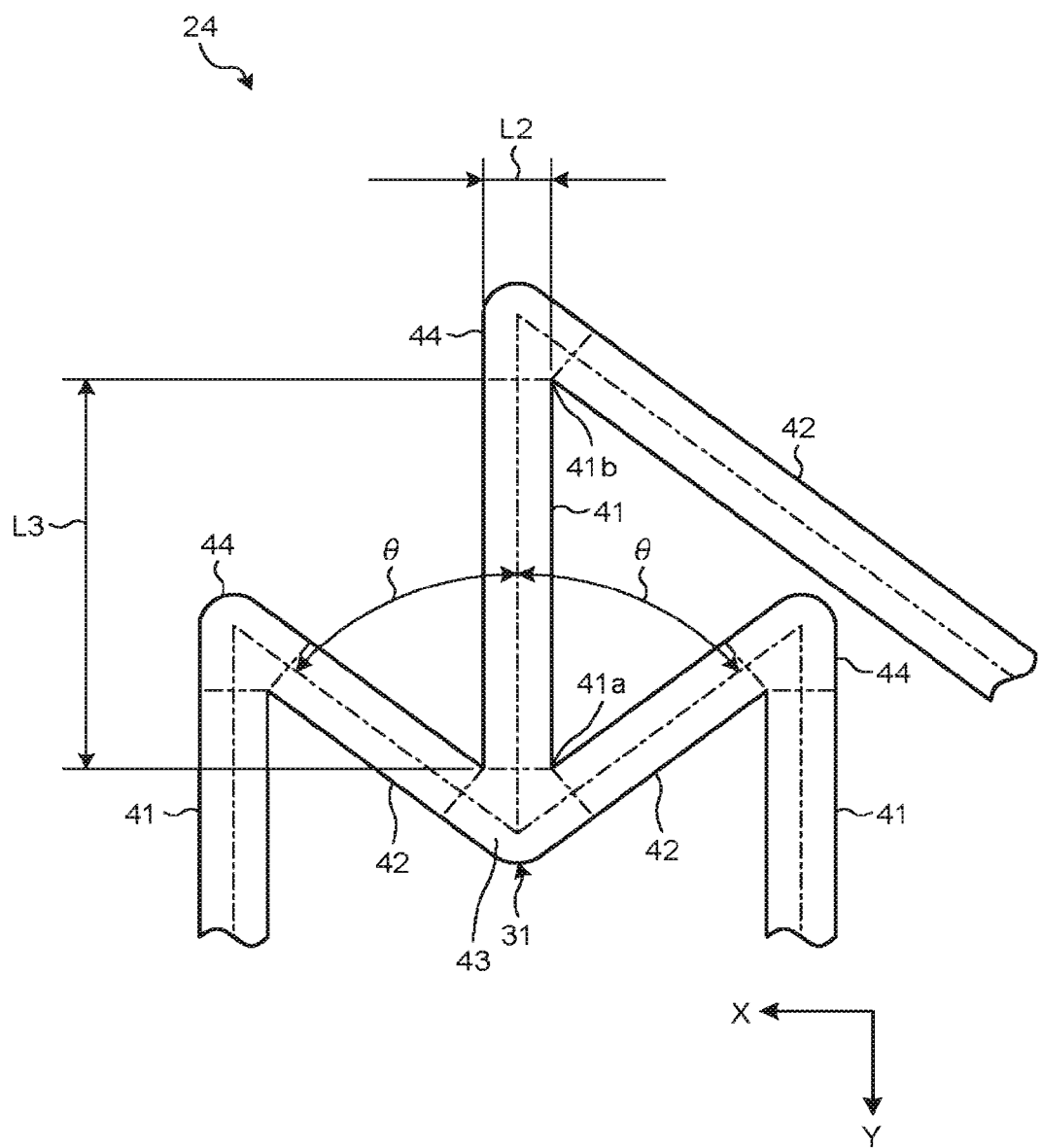
FIG. 9 is a plan view of the shape of the branching part according to a third embodiment.

A third embodiment is described below with reference to FIG. 9. FIG. 9 is a plan view of the shape of the branching part 31 according to the third embodiment. As illustrated in FIG. 9, the second parts 42 according to the third embodiment extend from the connecting part 43 in respective directions intersecting with the Y-axis at an intersection angle θ. In other words, the two second parts 42 extend in mirror symmetry and rotational symmetry with respect to the direction in which the first part 41 extends. The second parts 42 are not limited thereto.

The intersection angle θ is smaller than 90 degrees and larger than 0 degree, for example. As a result, the second parts 42 extend from the first end 41a so as to approach the second end 41b of the first part 41 in the direction along the Y-axis.

In the processing apparatus 10 according to the third embodiment, the second parts 42 extend from the connecting part 43 in the respective directions intersecting with the Y-axis at the intersection angle θ. The intersection angle θ is smaller than 90 degrees. With this structure, the length of the entire duct 24 in the direction along the Y-axis can be decreased while increasing the length L3 of the first part 41 in the direction along the Y-axis. As a result, the nozzle device 15 can be downsized.

The traveling direction of the inert gas G flowing through the first part 41 is opposite to that of the inert gas G flowing through the second parts 42 in the direction along the Y-axis. This structure reduces the inertial force of the inert gas G at the connecting part 43, thereby sending the inert gas G to the second parts 42 more uniformly.

Figure 10:
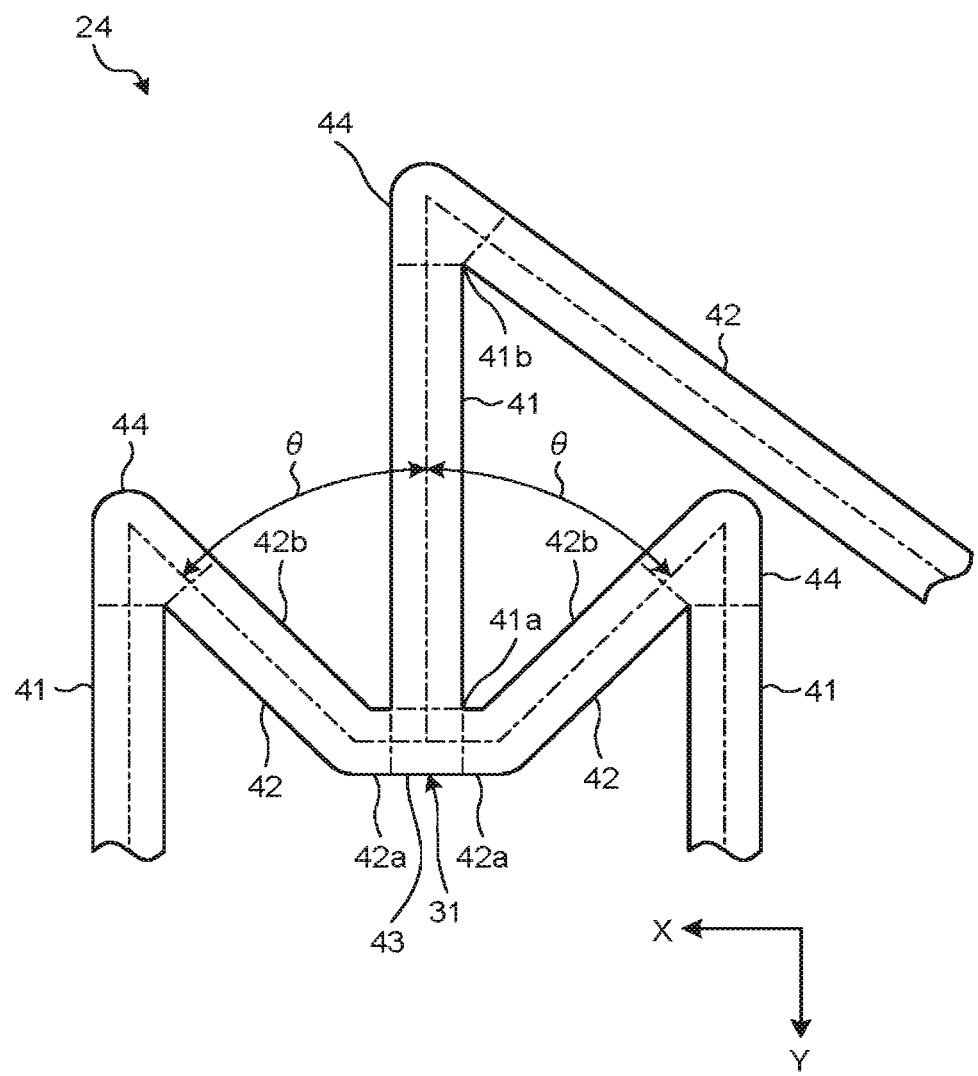
FIG. 10 is a plan view of a modification of the branching part according to the third embodiment.

FIG. 10 is a plan view of a modification of the branching part 31 according to the third embodiment. As illustrated in FIG. 10, the second parts 42 according to the present modification each have an orthogonal part 42a and an inclined part 42b.

The orthogonal parts 42a linearly extend in respective directions along the X-axis. In other words, the orthogonal parts 42a extend in respective directions intersecting with the Y-axis at 90 degrees. As a result, the inner surface of the connecting part 43 facing the first end 41a of the first part 41 also extends in the directions intersecting with the Y-axis at 90 degrees.

The inclined parts 42b extend from the orthogonal parts 42a in respective directions intersecting with the Y-axis at the intersection angle θ. The intersection angle θ is smaller than 90 degrees. The two second parts 42 each having the orthogonal part 42a and the inclined part 42b extend in mirror symmetry and rotational symmetry with respect to the direction in which the first part 41 extends.

The inner surface of the connecting part 43 facing the first end 41a of the first part 41 may be orthogonal to the direction in which the first part 41 extends like the branching part 31 illustrated in FIG. 10. The second parts 42 may have a shape bent like the second parts 42 illustrated in FIG. 10.

Figure 11:
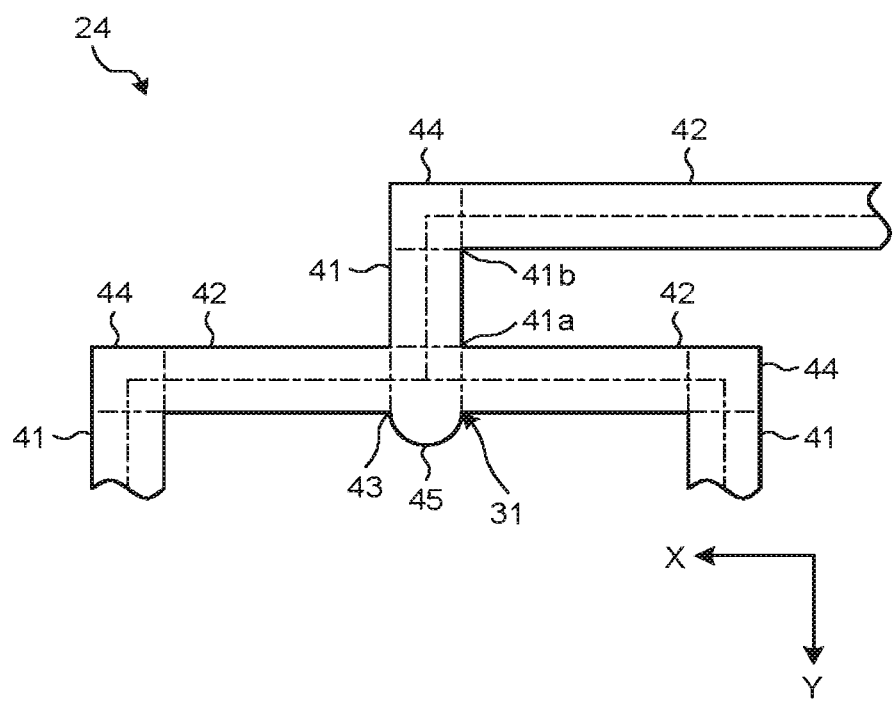
FIG. 11 is a plan view of the shape of the branching part according to a fourth embodiment.

A fourth embodiment is described below with reference to FIG. 11. FIG. 11 is a plan view of the shape of the branching part 31 according to the fourth embodiment. As illustrated in FIG. 11, the branching part 31 has a division part 45.

The division part 45 is provided to the connecting part 43 at the position facing the first end 41a of the first part 41. Part of the division part 45 may be provided to the second parts 42.

The division part 45 is recessed with respect to the first end 41a of the first part 41. In other words, the division part 45 is a recess formed away from the first end 41a of the first part 41.

The inert gas G flowing from the first part 41 into the connecting part 43 is caused to enter the division part 45 serving as the recess by the inertial force. The inertial force is reduced in the division part 45, and the inert gas G is sent to the two second parts 42.

In the processing apparatus 10 according to the fourth embodiment, the division part 45 is provided to the connecting part 43 at the position facing the first end 41a of the first part 41 and recessed with respect to the first end 41a. The recessed division part 45 receives the inert gas G flowing from the first end 41a of the first part 41 into the connecting part 43, reduces its force, and sends the inert gas G to the second parts 42. As a result, the inert gas G can be sent to the second parts 42 more uniformly.

The division part 45 may protrude with respect to the first end 41a of the first part 41. In this case, the protruding division part 45 divides the flow of the inert gas G flowing from the first end 41a of the first part 41 into the connecting part 43 and guides them to the two second parts 42. As a result, the division part 45 can send the inert gas G to the second parts 42 more uniformly.

Figure 12:
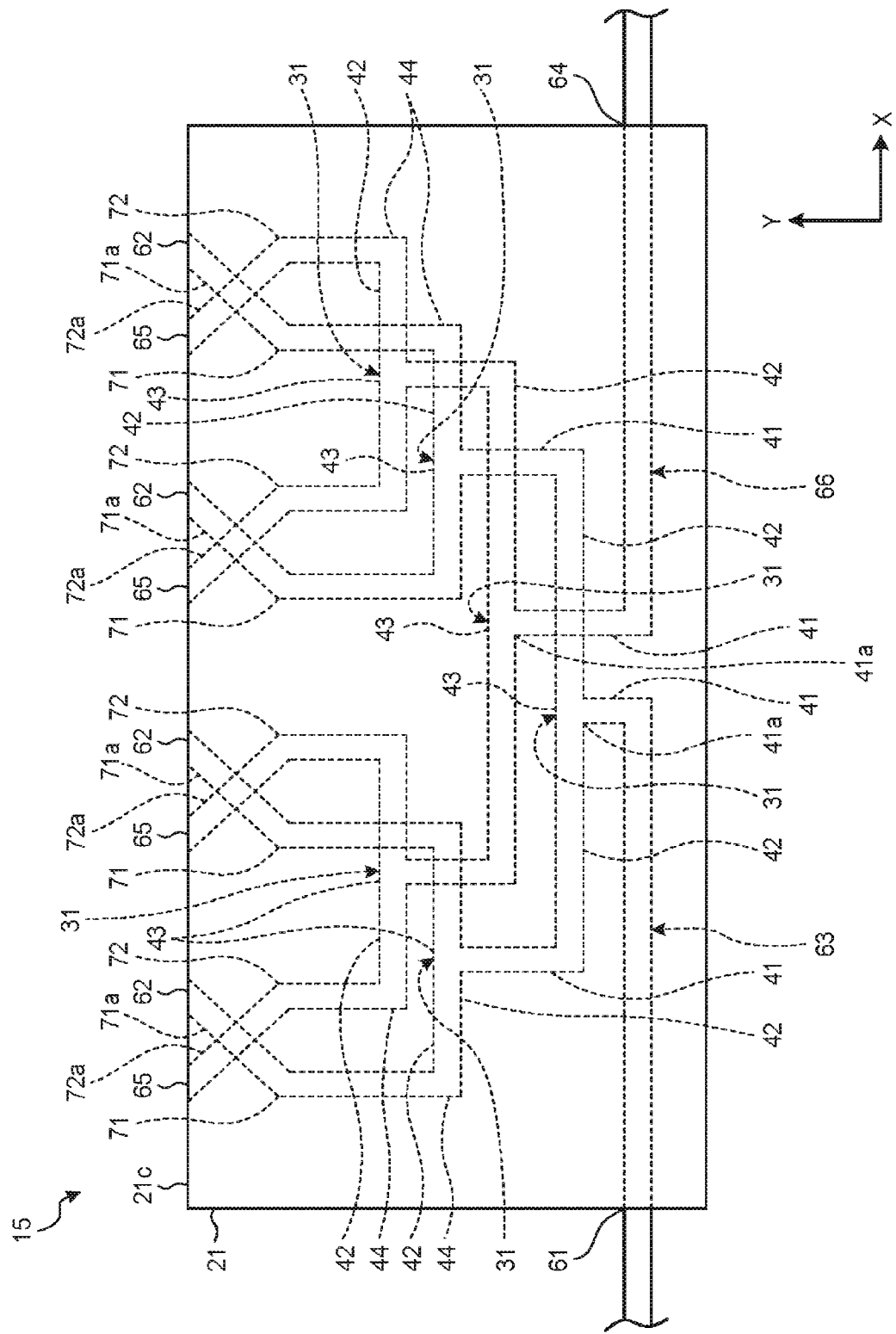
FIG. 12 is a plan view schematically illustrating the nozzle device according to a fifth embodiment.

A fifth embodiment is described below with reference to FIGS. 12 and 13. FIG. 12 is a plan view schematically illustrating the nozzle device 15 according to the fifth embodiment. As illustrated in FIG. 12, the nozzle device 15 according to the fifth embodiment includes a first supply port 61, a plurality of first discharge ports 62, a first duct part 63, a second supply port 64, a plurality of second discharge ports 65, and a second duct part 66. The first supply port 61 is an example of the first opening. The first discharge port 62 is an example of the second opening. The second supply port 64 is an example of a third opening. The second discharge port 65 is an example of a fourth opening.

The first supply port 61, the first discharge ports 62, the first duct part 63, the second supply port 64, the second discharge ports 65, and the second duct part 66 are provided to the base 21. The first discharge ports 62 and the second discharge ports 65 are provided to a single surface 21c of the base 21. The first duct part 63 and the second duct part 66 are provided in the base 21.

The first supply port 61 and the second supply port 64 are connected to the pump 13. The control unit 11 controls the pump 13, thereby selectively supplying the inert gas G from the pump 13 to one of the first supply port 61 and the second supply port 64.

The first duct part 63 is a flow passage that connects the first supply port 61 and the first discharge ports 62. In other words, the first supply port 61 is provided to one end of the first duct part 63, and the first discharge ports 62 are provided to the other ends of the first duct part 63. The first duct part 63 includes a plurality of branching parts 31 and a plurality of first nozzle parts 71. The branching part 31 of the first duct part 63 is an example of the first branching part.

Similarly to the branching part 31 according to the first embodiment, the branching part 31 of the first duct part 63 is a part that divides the path extending from the first supply port 61 to the first discharge ports 62 into two branches. The branching parts 31 according to the present embodiment branch the path extending from the first supply port 61 to the first discharge ports 62 at two stages. In other words, the first duct part 63 is branched twice in the path extending from the first supply port 61 to the first discharge ports 62.

The second duct part 66 is a flow passage that connects the second supply port 64 and the second discharge ports 65. In other words, the second supply port 64 is provided to one end of the second duct part 66, and the second discharge ports 65 are provided to the other ends of the second duct part 66. The second duct part 66 includes a plurality of branching parts 31 and a plurality of second nozzle parts 72. The branching part 31 of the second duct part 66 is an example of a second branching part.

Similarly to the branching part 31 according to the first embodiment, the branching part 31 of the second duct part 66 is a part that divides the path extending from the second supply port 64 to the second discharge ports 65 into two branches. The branching parts 31 according to the present embodiment branch the path extending from the second supply port 64 to the second discharge ports 65 at two stages. In other words, the second duct part 66 is branched twice in the path extending from the second supply port 64 to the second discharge ports 65.

Similarly to the first embodiment, the branching part 31 of the first duct part 63 and the branching part 31 of the second duct part 66 each have the first part 41, the two second parts 42, and the connecting part 43. The first part 41 of the second duct part 66 is an example of a third part. The second part 42 of the second duct part 66 is an example of a fourth part. Similarly to the first embodiment, the first part 41 linearly extends in the direction along the Y-axis.

Similarly to the first embodiment, the second parts 42 are connected to the first end 41a of the first part 41 by the connecting part 43. The second parts 42 linearly extend from the connecting part 43 in respective direction along the X-axis. In other words, the second parts 42 extend in respective directions intersecting with the Y-axis at 90 degrees.

The path lengths between the first supply port 61 and the respective first discharge ports 62 are the same in the first duct part 63. Furthermore, the numbers of branching parts 31 provided between the first supply port 61 and the respective first discharge ports 62 are the same in the first duct part 63. In addition, the shapes and the sizes of the branching parts 31 provided at the stages are the same. As described above, the path lengths and the structures of the paths extending between the first supply port 61 and the respective first discharge ports 62 are the same. As a result, resistances acting on the fluid flowing through the paths extending between the first supply port 61 and the respective first discharge ports 62 are equal (equivalent conductance).

Similarly to this, the path lengths between the second supply port 64 and the respective second discharge ports 65 are the same in the second duct part 66. Furthermore, the numbers of branching parts 31 provided between the second supply port 64 and the respective second discharge ports 65 are the same in the second duct part 66. In addition, the shapes and the sizes of the branching parts 31 provided at the stages are the same. As described above, the path lengths and the structures of the paths extending between the second supply port 64 and the respective second discharge ports 65 are the same. As a result, resistances acting on the fluid flowing through the paths extending between the second supply port 64 and the respective second discharge ports 65 are equal (equivalent conductance).

The path length between the first supply port 61 and the first discharge ports 62 in the first duct part 63 is equal to that between the second supply port 64 and the second discharge ports 65 in the second duct part 66. The sizes of the first and the second parts 41 and 42 of the branching parts 31 in the first duct part 63 may be different from those of the first and the second parts 41 and 42 of the branching parts 31 in the second duct part 66.

The first nozzle parts 71 connect the second parts 42 of the branching parts 31 closest to the first discharge ports 62 to the respective first discharge ports 62 in the path extending from the first supply port 61 to the first discharge ports 62. The first nozzle parts 71 each have a first inclined part 71a connected to the first discharge port 62 and extending in a manner inclined with respect to the Y-axis. The first inclined part 71a extends obliquely to the upper right in FIG. 12, for example.

The second nozzle parts 72 connect the second parts 42 of the branching parts 31 closest to the second discharge ports 65 to the respective second discharge ports 65 in the path extending from the second supply port 64 to the second discharge ports 65. The second nozzle parts 72 each have a second inclined part 72a connected to the second discharge port 65 and extending in a manner inclined with respect to the Y-axis. The second inclined part 72a extends obliquely to the upper left in FIG. 12, for example.

Figure 13:
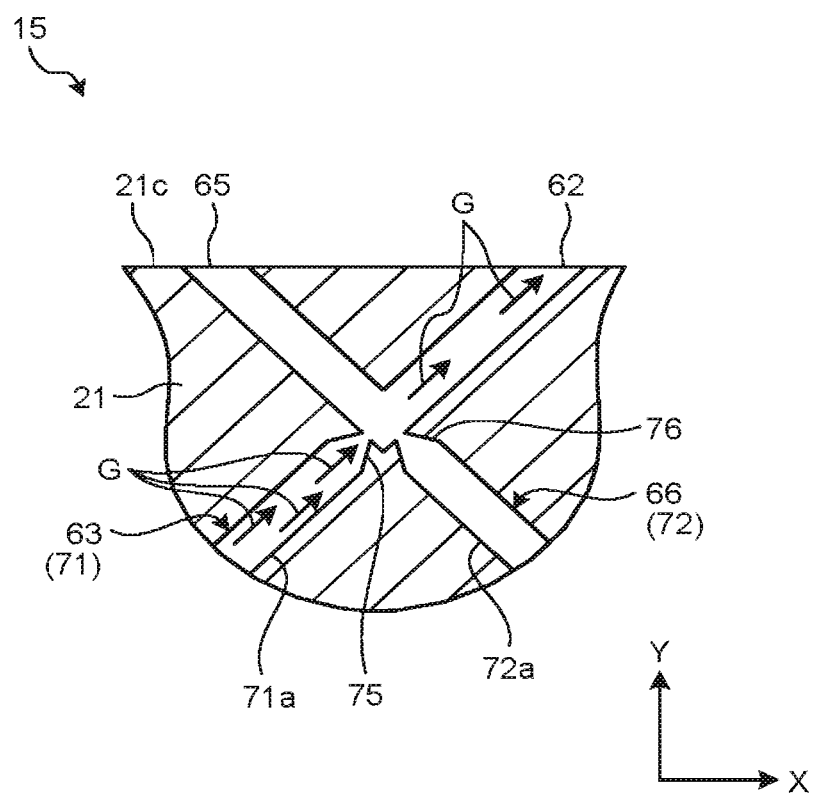
FIG. 13 is a sectional view illustrating a first inclined part and a second inclined part according to the fifth embodiment in an enlarged manner.

FIG. 13 is a sectional view illustrating the first inclined part 71a and the second inclined part 72a in an enlarged manner. As illustrated in FIG. 13, the first inclined part 71a of the first nozzle part 71 and the second inclined part 72a of the second nozzle part 72 are connected to each other in an intersecting manner. The first inclined part 71a and the second inclined part 72a may intersect with each other at 90 degrees as illustrated in FIG. 13 or another angle.

The first inclined part 71a of the first nozzle part 71 has a first small-diameter part 75. The first small-diameter part 75 is provided at a position closer to (on the upstream of) the first supply port 61 than a part connected to the second inclined part 72a in the path extending from the first supply port 61 to the first discharge port 62. The first small-diameter part 75 is provided adjacent to the part connected to the second inclined part 72a in the first inclined part 71a, for example.

The first small-diameter part 75 is a part in which the cross-sectional area of the first nozzle part 71 decreases. In other words, the cross-sectional area of the first small-diameter part 75 is smaller than the other parts of the first nozzle part 71. The first small-diameter part 75, for example, is formed by a wall protruding from the inner surface of the first nozzle part 71.

The second inclined part 72a of the second nozzle part 72 has a second small-diameter part 76. The second small-diameter part 76 is provided at a position closer to (on the upstream of) the second supply port 64 than a part connected to the first inclined part 71a in the path extending from the second supply port 64 to the second discharge port 65. The second small-diameter part 76, for example, is provided adjacent to the part connected to the first inclined part 71a in the second inclined part 72a.

The second small-diameter part 76 is a part in which the cross-sectional area of the second nozzle part 72 decreases. In other words, the cross-sectional area of the second small-diameter part 76 is smaller than the other parts of the second nozzle part 72. The second small-diameter part 76, for example, is formed by a wall protruding from the inner surface of the second nozzle part 72.

When the pump 13 supplies the inert gas G to the first supply port 61 in the nozzle device 15 described above, for example, the inert gas G passes through the branching parts 31. The inert gas G is branched twice by the branching parts 31 and flows into the first nozzle parts 71.

In the first small-diameter part 75, the cross-sectional area of the first nozzle part 71 decreases. By passing through the first small-diameter part 75, the inert gas G increases its flow speed. The accelerated inert gas G passes through the part connected to the second inclined part 72a and is discharged from the first discharge port 62 positioned at the end of the first nozzle part 71.

Also when the pump 13 supplies the inert gas G to the second supply port 64, the same state as described above is created. Specifically, by passing through the second small-diameter part 76, the inert gas G increases its flow speed. The accelerated inert gas G passes through the part connected to the first inclined part 71a and is discharged from the second discharge port 65 positioned at the end of the second nozzle part 72. The direction in which the inert gas G is discharged from the second discharge port 65 is different from the direction in which the inert gas G is discharged from the first discharge port 62.

In the processing apparatus 10 according to the fifth embodiment, the first nozzle parts 71 each have the first small-diameter part 75. The first small-diameter part 75 is provided at a position closer to the first supply port 61 than the part connected to the second nozzle part 72 in the path extending from the first supply port 61 to the first discharge port 62. The first small-diameter part 75 is a part in which the cross-sectional area of the first nozzle part 71 decreases. With this structure, the inert gas G passing through the first nozzle part 71 and traveling toward the first discharge port 62 increases its flow speed by passing through the first small-diameter part 75. As a result, the inert gas G is more likely to travel straight toward the first discharge port 62. This structure thus suppresses the entering of the inert gas G in the first nozzle part 71 into the second nozzle part 72. This structure also suppresses the entering of the inert gas G in the second nozzle part 72 into the first nozzle part 71.

The inert gas G in the pump 13 according to the fifth embodiment is selectively supplied to one of the first supply port 61 and the second supply port 64. The processing apparatus 10 may include a selector valve that can supply the inert gas G to one of the first supply port 61 and the second supply port 64.

While the ducts 24, 63, and 66 according to the embodiments above extend on the X-Y plane, they are not limited thereto. Two or more ducts extending on the X-Y plane, for example, may be stacked in the direction along the Z-axis and connected to each other to serve as a multilevel structure. As a result, the nozzle device 15 can be downsized in the X-Y plane.

Figure 14:
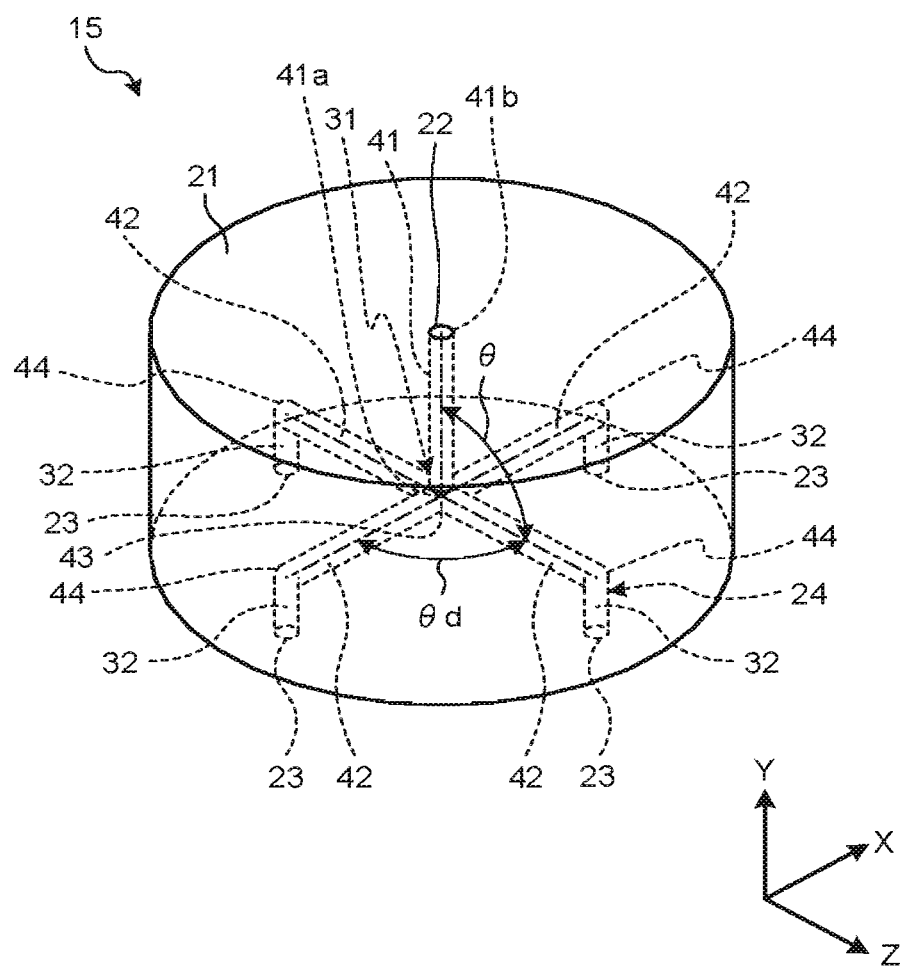
FIG. 14 is a perspective view of the nozzle device according to a sixth embodiment.

A sixth embodiment is described below with reference to FIG. 14. FIG. 14 is a perspective view of the nozzle device 15 according to the sixth embodiment. As illustrated in FIG. 14, the nozzle device 15 according to the sixth embodiment includes the supply port 22, four discharge ports 23, and the duct 24.

In the duct 24 according to the sixth embodiment, the branching part 31 has the first part 41, four second parts 42, and the connecting part 43. In other words, the branching part 31 according to the present embodiment divides the path extending from the supply port 22 to the discharge ports 23 into four branches. The first part 41 linearly extends in the direction along the Y-axis.

The connecting part 43 connects the four second parts 42 to the first end 41a of the first part 41. Two of the four second parts 42 linearly extend from the connecting part 43 in respective directions along the X-axis. By contrast, the other two of the second parts 42 linearly extend from the connecting part 43 in respective directions along the Z-axis.

As described above, the four second parts 42 extend in respective directions intersecting with the Y-axis at 90 degrees. The four second parts 42 extend in respective directions intersecting with each other at 90 degrees. In other words, the two second parts 42 extend in rotational symmetry with respect to the direction in which the first part 41 extends. The four second parts 42 are connected to the respective discharge ports 23 by four couplers 44 and four nozzles 32.

In the processing apparatus 10 according to the sixth embodiment, the duct 24 extends in a three-dimensional direction, and the four second parts 42 extend in the respective directions intersecting with the Y-axis at 90 degrees. As described above, three or more second parts 42 may extend from the first end 41a of the first part 41.

The angles (branching angles 9d) at which the second parts 42 intersect with each other may be different from one another as long as the angles (intersection angles θ) at which the second parts 42 intersect with the direction in which the first part 41 extends are the same. In other words, the angles (branching angles 9d) at which the second parts 42 intersect with each other on the X-Z plane in FIG. 14 may be different from one another.

The cross-sectional area of the first end of the first part according to at least one of the embodiments above is smaller than that of the second end of the first part. This structure makes the flow rates of the fluid passing through the second openings more uniform.

While certain embodiments of the present invention have been described, these embodiments have been presented by way of example only and are not intended to limit the scope of the invention. The novel embodiments described herein may be embodied in a variety of other forms. Various omissions, substitutions, and changes may be made without departing from the spirit of the invention. The embodiments and the modifications thereof are included in the accompanying claims and their equivalents and fall within the scope and spirit of the invention.

In the embodiments above, for example, the inert gas G serving as an example of the fluid is supplied from the supply port 22 serving as an example of the first opening and discharged from the discharge ports 23 serving as an example of the second opening. The fluid, however, may be sucked from the second openings and discharged from the first opening.

The invention claimed is:

1. A nozzle device comprising:
    a first opening;
    a plurality of second openings; and
    a first duct part including first branching parts each having a first part extending in a first direction and a plurality of second parts connected to a first end of the first part and extending in respective directions intersecting with the first direction, the first duct part connecting the first opening and the second openings, branched at least once by the first branching parts in a path from the first opening to the second openings, and having the same path length and the same number of first branching parts between the first opening and the second openings, wherein
    the cross-sectional area of the first end of the first part is smaller than the cross-sectional area of a second end of the first part,
    the first part of one of the first branching parts is orthogonal to one of the second parts of another of the first branching parts,
    the cross-sectional shape of the first part has a first length and a second length,
    the first length is a length in the direction in which the one of the second parts of the another of the first branching parts extends in a planar view from a direction in which the first part extends,
    the second length is a length in a second direction orthogonal both to the first direction and to the direction in which the one of the second parts of the another of the first branching parts extends, and
    the first length is smaller than the second length.

2. The nozzle device according to claim 1, wherein
    the second end of the first part of the one of the first branching parts is connected to the one of the second parts of the another of the first branching parts,
    the width of the first end and the second end of the first part is a length in a direction in which the one of the second parts of the another of the first branching parts orthogonal to the first part extends in a planar view from the direction in which the first part extends, and
    the width of the first end of the first part is smaller than the width of the second end of the first part.

3. The nozzle device according to claim 2, wherein the width of the first end of the first part is equal to or smaller than 80% of the width of the second end of the first part.

4. The nozzle device according to claim 1, further comprising:
    a third opening;
    a plurality of fourth openings; and
    a second duct part including second branching parts each having a third part extending in the first direction and a plurality of fourth parts connected to a first end of the third part and extending in respective directions intersecting with the first direction, the second duct part connecting the third opening and the fourth openings, branched at least once by the second branching parts in a path extending from the third opening to the fourth openings, and having the same path length and the same number of second branching parts between the third opening and the fourth openings, wherein
    the first duct part further includes a first nozzle parts that connects the second parts of the first branching parts closest to the second openings to the respective second openings in the path extending from the first opening to the second openings,
    the second duct part further includes a second nozzle parts that connects the fourth parts of the second branching parts closest to the fourth openings to the respective fourth openings in the path extending from the third opening to the fourth openings and that is connected to the first nozzle parts in an intersecting manner, the first nozzle parts has a first small-diameter parts provided at a position closer to the first opening than a part connected to the second nozzle parts in the path extending from the first opening to the second openings and having a smaller cross-sectional area in the first nozzle parts, and the second nozzle parts has a second small-diameter parts provided at a position closer to the third opening than a part connected to the first nozzle parts in the path extending from the third opening to the fourth openings and having a smaller cross-sectional area in the second nozzle parts.

5. A processing apparatus comprising:

the nozzle device according to claim 1;

an accommodating unit configured to accommodate a fluid; and a supply unit configured to supply the fluid in the accommodating unit to the first opening.

6. The nozzle device according to claim 1, wherein the cross-sectional area of the first end of the first part is equal to or smaller than 80% of the cross-sectional area of the second end of the first part.

\* \* \* \* \*